United States Patent
Saulnier et al.

[19]

[11] Patent Number: 5,903,594
[45] Date of Patent: *May 11, 1999

[54] POWER LINE COMMUNICATIONS SPREAD SPECTRUM PROTOCOL

[75] Inventors: Emilie Thorbjorg Saulnier, Rexford; Richard August Korkosz, Rotterdam Junction; John Erik Hershey, Ballston Lake; Michael James Hartman, Clifton Park; Ralph Thomas Hoctor, Saratoga Springs; Nick Andrew Van Stralen, Schenectady, all of N.Y.

[73] Assignee: General Electric Company, Schenectady, N.Y.

[*] Notice: This patent is subject to a terminal disclaimer.

[21] Appl. No.: 08/838,215

[22] Filed: Apr. 16, 1997

[51] Int. Cl.$^6$ .......................... H04B 15/00; H04M 11/04
[52] U.S. Cl. ................................. 375/200; 340/310.02
[58] Field of Search .................. 340/870.02, 870.03, 340/870.06, 870.11, 310.01, 310.02, 310.06; 379/106.03, 106.05, 106.11, 106.07; 375/346, 200

[56] References Cited

U.S. PATENT DOCUMENTS

| | | | |
|---|---|---|---|
| 4,057,793 | 11/1977 | Johnson et al. | 340/310 |
| 4,199,761 | 4/1980 | Whyte et al. | 340/695 |
| 4,396,915 | 8/1983 | Farnsworth et al. | 340/870.03 |
| 4,700,188 | 10/1987 | James | 340/870.03 |
| 5,032,833 | 7/1991 | Laporte | 340/825.02 |
| 5,519,692 | 5/1996 | Hershey et al. | 370/18 |
| 5,519,725 | 5/1996 | Hershey et al. | 375/216 |
| 5,731,765 | 3/1998 | Allison et al. | 340/870.03 |

FOREIGN PATENT DOCUMENTS 09509473  4/1995  WIPO .......................... H02J 13/00

Primary Examiner—Temesghen Ghebretinsae
Assistant Examiner—Albert Park
Attorney, Agent, or Firm—Marvin Snyder; Douglas E. Stoner

[57] ABSTRACT

A spread spectrum protocol in a power line communication (PLC) system uses Harmonic Modulation (HM) as true spread spectrum modulation made up of a plurality of modulated tones spaced in frequency with equal distance between adjacent tones. The protocol incorporates the following modes:

"Conventional"—Master/Slave relation of meters to a common hub.

"Leap Frog"—performing data relay through locally elected/designated meters for relay to a central hub or a distributed set of concentrators.

"Alarm Channel"—reserving an HM signal set for meters to telemeter their configuration in a subnetwork after a power distribution network reconfiguration.

"Probing"—using HM polling to diagnose the location of a feeder fault.

"Derived Timing"—master derived timing for inbound message framing.

"Rate Adapting"—allocating a mix of number of HM channels to the outbound/inbound ratio according to message traffic control requirements and power line distribution topology.

"Priority/Noise Based Adapting"—allocating a different mix of number of HM channels to the outbound/inbound ratio based on message priority or noise conditions.

7 Claims, 5 Drawing Sheets

POWER LINE COMMUNICATIONS SPREAD SPECTRUM PROTOCOL

CROSS-REFERENCE TO RELATED APPLICATION

This application is related in subject matter to application Ser. No. 08/728,020 filed Oct. 9, 1996, by Hershey et al. for "Power Line Communication System" and assigned to the assignee of this application. The subject matter of that application is incorporated herein by reference.

BACKGROUND OF THE INVENTION

1. Field of the Invention

This invention generally relates to electronic signal modulation, and more particularly, to a spread spectrum modulation protocol having particular application in power line communications.

2. Background Description

Electric power companies typically have a service person visit customers and read a power meter to determine the amount of power consumed for billing purposes. This can be cumbersome and time consuming when there are many customers, especially if they are dispersed over a large geographic area.

It would be beneficial for power companies to read these electric power meters remotely, through a communications path. The power wires connected to each customer's power meter constitute a possible path for communicating with the power meters; however, existing modulation techniques may not easily be implemented or reliably perform in the high-noise environment of a power line. Moreover, the inductances of voltage transformers employed in the power line network introduce non-linear phase shifts in signals passing through the transformer. Therefore, complex communications systems are required to perform reliably in the high-noise, phase distorted power line channels. For example, some of these systems monitor several frequency channels, select an appropriate channel, and then indicate the appropriate frequency to other communicating units. Other systems, such as that set forth in U.S. Pat. No. 5,185,591 to Shuey, issued Feb. 9, 1993, employ a plurality of signals which are not harmonically related, so as to require elaborate filtering and signal extraction.

Currently, there is need for a relatively simple communication system which can utilize existing power lines to remotely read multiple power meters simultaneously.

SUMMARY OF THE INVENTION

Geometric Harmonic Modulation (GHM) has been proposed for use in power line communication systems because its spectrum is ideal in combating carrier synchronous noise. The GHM spectrum can be laid interstitially with the noise harmonics and therefore be effectively spectrally disjoint with the synchronous noise process spectrum. In the present invention, a spread spectrum protocol is employed in a power line communication system. The invention utilizes Harmonic Modulation (HM), which grew out of GHM, as a true spread spectrum modulation consisting of a plurality of modulated tones spaced in frequency, with equal distance between adjacent tones. The protocol implemented by the invention incorporates the following modes:

"Conventional"—Master/Slave relation of meters to a common hub.

"Leap Frog"—performing data relay through locally elected/designated meters for relay to a central hub or a distributed set of concentrators.

"Alarm Channel"—reserving an HM signal set for meters to telemeter their configuration in a subnetwork after a power distribution network reconfiguration.

"Probing"—using HM polling to diagnose the location of a feeder fault.

"Derived Timing"—master derived timing for inbound message framing.

"Rate Adapting"—allocating a different mix of number of HM channels to the outbound/inbound ratio.

"Priority/Noise Based Adapting"—allocating a different mix of number of HM channels based on message priority or noise conditions.

DETAILED DESCRIPTION OF A PREFERRED EMBODIMENT OF THE INVENTION

Basic GHM

Figure 1:
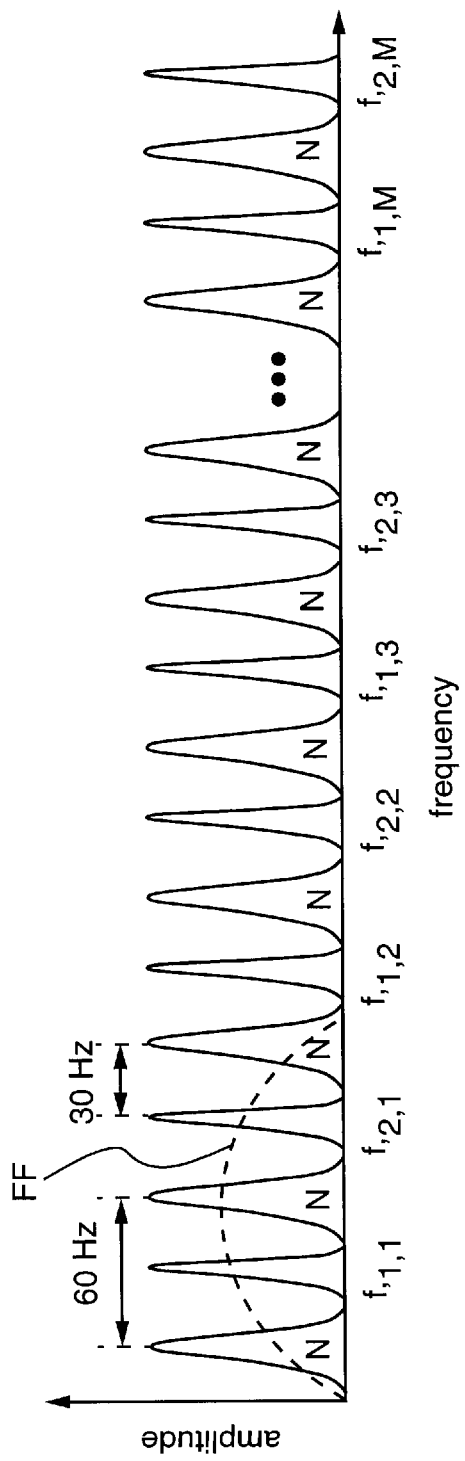
FIG. 1 is a graph of a Harmonic Modulation (HM) signaling power spectrum interleaved with power line interference.

Geometric Harmonic Modulation (GHM) for communications systems has been described for radio wave communication in Hershey et al. U.S. Pat. No. 5,519,725, issued May 21, 1996, assigned to the instant assignee, and which is incorporated herein by reference. GHM allocates signaling energy into lobes, or tones, at different frequencies evenly spaced at geometrically increasing multiples of a base frequency. The GHM signaling waveforms $\{W_n(\Phi,R;t)\}$ are true spread spectrum signals in that the signal bandwidth, i.e., the bandwidth from the lowest frequency tone to the highest, vastly exceeds the information bandwidth conveyed by the GHM transmission.

Binary GHM signals convey binary data by inverting or not inverting the GHM waveform $\{W_n(\Phi,R;t)\}$ during a bit duration interval.

It is not necessary for the GHM transmitter and the GHM receiver to "agree" on the best frequency on which to send data, as the same data is sent on each of the GHM tones which are spread through the 5–10 kHz band. Thus the operation or signaling protocol of the GHM system is less complex than a single tone system in which the transmitter and receiver must jointly search for, and agree upon, a frequency which is not attenuated by a fading phenomenon such as standing waves, for example.

It was found that by modifying the GHM signaling waveform $\{W_n(\Phi,R;t)\}$ it can have spectral properties well suited to the synchronous noise environment encountered on much of the power line network.

A more general look at GHM and power line noise reveals that lobes of the modulated signal on a frequency spectrum should be interleaved with the power line noise. Since power line noise has a great deal of interference at the basic oscillation frequency and overtones thereof, the signal should not reside on these frequency regions. By modulating the signal to reside between the interference lobes, the signal will be defined by:

$$S_i(t) = \sum_{k=1}^{M} \{\alpha_{ik}\sin(2\pi f_{ik}t + \phi_{ik}) + \beta_{ik}\cos(2\pi f_{ik}t + \theta_{ik})\} \quad (1)$$

where M is the number of lobes of the signal $s_i(t)$, i indicates one of a plurality of different signals which may be transmitted simultaneously, $f_{ik}$ represents a selected frequency, t represents time, and $\alpha_{ik}$ and $\beta_{ik}$ represent fixed amplitude coefficients for the i-th waveform. The phases $\phi_{ik}$, $\theta_{ik}$ of equation (1) may be assigned specific values for each signaling set or, in the most general form of equation (1), may take on random values for any desired signaling set. A particular choice of phases, along with amplitudes and frequencies, determines a unique signaling set that may be used for a particular power line communication application depending upon considerations of information capacity, number of users, number of lines coupling responses, and communication channel characteristics. By selecting frequencies $f_{ik}$ correctly, signals $s_i$ may be interleaved with harmonic power line noise and will be referenced as Harmonic Modulation (HM).

In FIG. 1, a frequency versus amplitude spectrum graph shows harmonic power line noise lobes, marked "N" at the basic frequency (60 Hz), and integer multiples of the basic frequency. An HM signal $s_1$ to be sent has frequency components $f_{11}, f_{12}, \ldots, f_{1M}$. Similarly, an HM signal $s_2$ to be sent has components $f_{21}, f_{22}, \ldots, f_{2M}$. Again each frequency component of signal i carries the same information.

A dotted trace FF depicts an example of frequency-selective fading. This example shows that the first frequency lobes of signals $s_1$ and $s_2$, being $f_{11}$ and $f_{21}$, respectively, will be attenuated, while other frequencies will be unaffected.

Modifying GHM Frequencies

The HM signal of FIG. 1 has no appreciable frequency content at 60 Hz and its harmonics. Thus, such a modified GHM signal may be received over a power line communication link without much interference from the 60 Hz synchronous signal.

The parameter M represents the number of local maxima ("main lobes") of the power spectral density, and the signaling rate controls the spectral density and spectral width of the main lobes. For a meter reading or other power line communications application, a larger value of M may be used for greater spectrum spreading.

Figure 2:
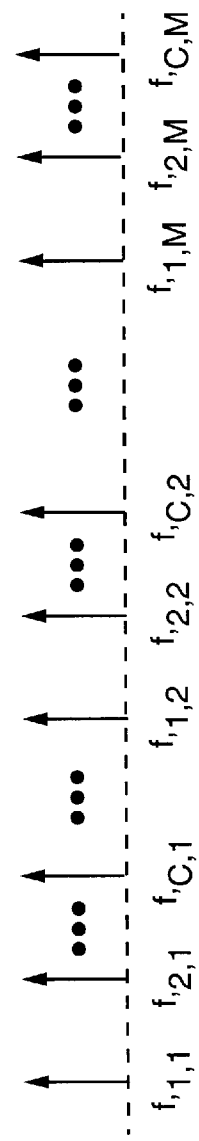
FIG. 2 is a graph showing HM tone signal sets as a spread spectrum modulation consisting of a plurality of modulated tones spaced in frequency.

The spectrum of the modified HM signaling waveform must be in a frequency range sufficiently above the 60 Hz fundamental frequency to avoid interference with that frequency, and still carry through a distribution transformer. The modulation of the HM waveform must not be significantly affected or corrupted by non-linear phase shifts which occur as a signal passes through a transformer. The HM provided by the invention is an outgrowth of GHM. HM is a true spread spectrum modulation and consists of M modulated tones spaced in frequency with equal distance between adjacent tones. One set of such tones is a family of signal sets. There are C such sets, as indicated in FIG. 2. All M tones within the same set are identically modulated. Different sets can carry different data messages simultaneously on the same power line without mutual interference, as the signaling is spectrally disjoint.

Transmitter Implementation

Figure 3:
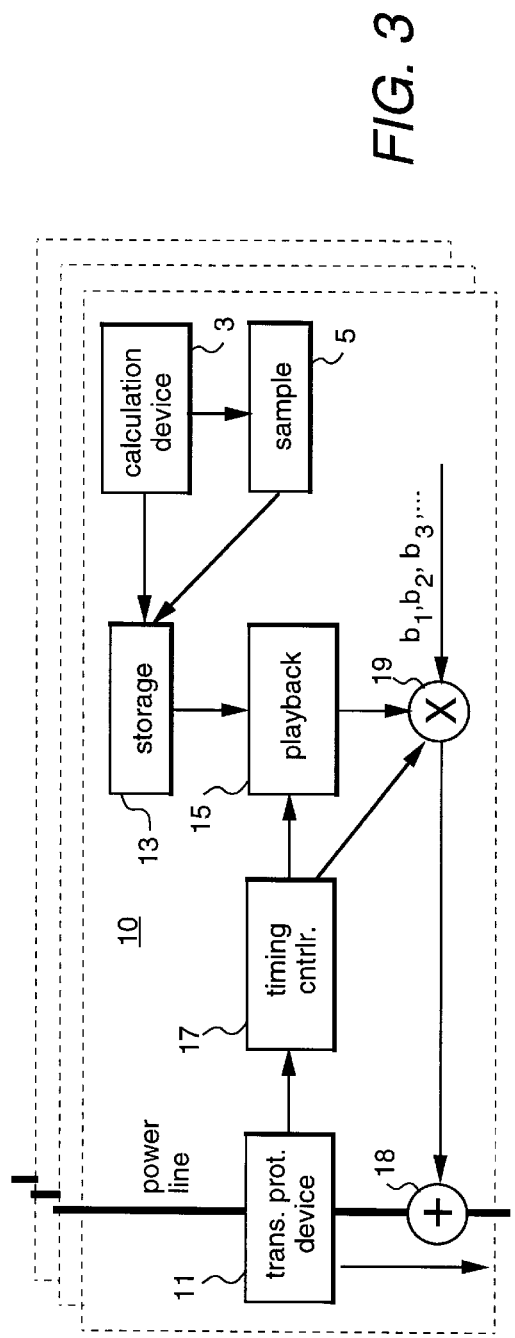
FIG. 3 is a simplified block diagram of a power line communication transmitter employing harmonic modulation (HM) for spread spectrum power line communications.

FIG. 3 is a simplified block diagram of a transmitter 10 coupled to a power line, and represents one of many transmitters which may be coupled to the same power line. A given number of tones M to be transmitted are selected. Signals according to equation (1) are then synthesized by a calculation device 3, which may be a general purpose computer (i.e., microprocessor) or a device which creates a continuous waveform (e.g., digital signal processor). The output signal of calculation device 3 is sampled by a sampler 5. The samples are saved in a storage device 13 which, in its preferred embodiment, is a non-volatile memory such as an electronically erasable and programmable read only memory ($E^2$PROM). The selection, synthesizing, sampling and storage operations may all be performed prior to transmission, and need not be performed before each use of transmitter 10.

Preferably, a transient protection device 11, which limits power surges in order to protect equipment down line, is coupled to the power line and applies the power line voltage to a timing controller 17 which, in turn, determines master timing information from the fundamental power line frequency. A playback device 15, controlled by timing controller 17 and coupled to storage device 13, reads out the samples at a rate synchronous with the power line voltage.

A multiplier, also coupled to timing controller 17, multiplies the waveform created by playback device 15 by a single bit during each single bit period. The bit sequence is modified prior to transmission by changing bit values to a series of ones and negative ones, instead of ones and zeros. Therefore, when the waveform and signal bits are provided to multiplier 19, a bit value of one will not change the waveform for a bit period, while a bit value of negative one will invert the waveform. The result is an HM modulated signal which is summed with the power line signal at a summer 18 and communicated over the power line to a receiver.

Receiver Implementation

Figure 4:
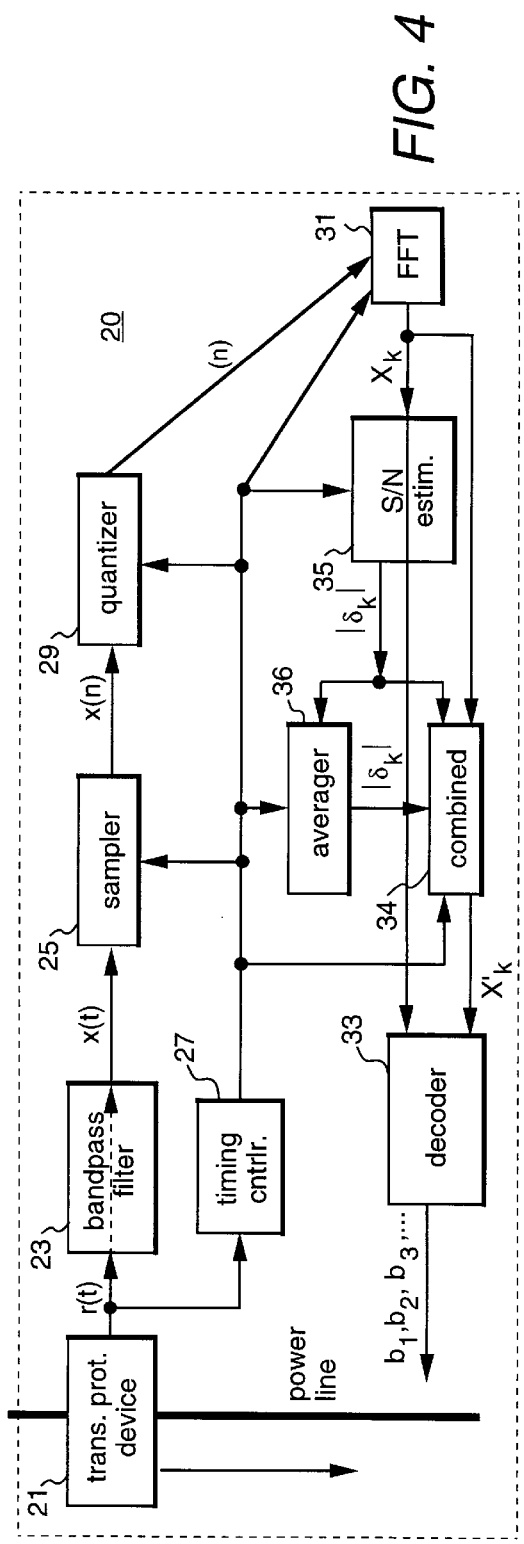
FIG. 4 is a simplified block diagram of a power line communication receiver for decoding HM spread spectrum signaling.

FIG. 4 illustrates a simplified HM receiver 20. Again, several receivers may be coupled to the same power line. Receiver 20 is coupled to the power line through a transient protection device 21 which limits power surges, protecting equipment down line. Transient protection device 21 is coupled to a timing controller 27 and a sampler 25. Timing controller 27 monitors the power line voltage by way of a signal r(t) passed from transient protection device 21 to determine fundamental power line frequency, and provides a timing signal to other elements of receiver 20.

Sampler 25, clocked by timing controller 27, samples a continuous signal x(t) provided from transient protection device 21 to produce a series of discrete time samples {x(n)}. Optionally, a bandpass filter 23 is coupled between transient protection device 21 and sampler 25 to remove noise outside the useful spectrum of the HM signaling. The discrete time samples, {x(n)} are provided to a quantizer 29 which reduces the precision of the samples to a set of $2^B$ values, where B is the number of bits allocated per sample.

The quantized samples, {(n)}, are passed to a Fast Fourier Transform (FFT) module 31 which determines the inverse Fourier transform coefficients {$X_k(t)$} for signal {(n)}. In one embodiment, the Fourier transform coefficients from FFT module 31 may be passed directly to a decoder 33, which recovers the message bits from the HM signal.

Optionally, a signal-to-noise (S/N) estimator 35 receives the Fourier coefficients from FFT 31 and determines an estimated signal-to-noise ratio for each Fourier coefficient. A combiner circuit 34 coupled between FFT module 31 and decoder 33 receives the S/N estimate and Fourier coefficients and provides weighting to the coefficients based upon the SIN estimate for that frequency band. This may be any conventional weighting technique, and may be as simple as eliminating coefficients which do not meet a predetermined threshold.

Because the data rate at which the automatic meter reading communications take place is relatively low with respect to processing speed, a significant amount of post processing is possible. A better estimate of the SIN ratio therefore may be made by averaging over a predetermined number of symbols in a particular message. Accordingly, in an optional embodiment, an averager 36 may be coupled between S/N estimator unit 35 and combiner 34 to provide this averaging capability.

The PLC Spread Spectrum Protocol

The parameter M of the HM signal determines the number of spectral peaks in its spectrum and therefore is a measure of its spectral occupancy. These occupancies can be chosen based on the traffic volume ratio of inbound to outbound rates.

Error control should be considered for both inbound and outbound traffics. Specifically, use of a forward error correction coding method should be considered for both traffics. An appropriate technique should include resistance to burst errors and be able to incorporate side information for estimating channel condition for information bit decisions.

Figure 5:
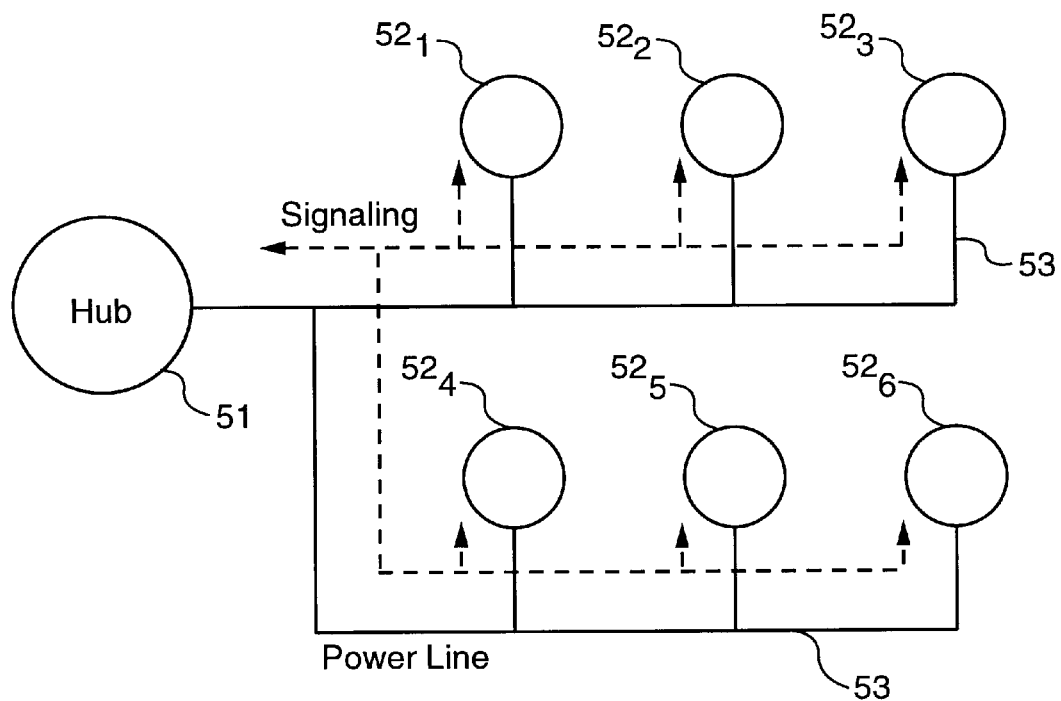
FIG. 5 is a high level block diagram showing meters connected to a hub via power lines, illustrating operation in the "conventional" mode.

The invention focuses on seven modes of operation. The first mode, "conventional" or Master/Slave relation of meters to a common hub, is a banausic implementation wherein the individual meter communications are all individually controlled by a single hub. This is illustrated in FIG. 5. In this mode, hub 51 communicates with a plurality of meters $52_1$ to $52_6$ via a power line 53. Hub 51, which contains both a power line communication transmitter and a power line communication receiver, polls the meters, and the meters respond with data.

Figure 6:
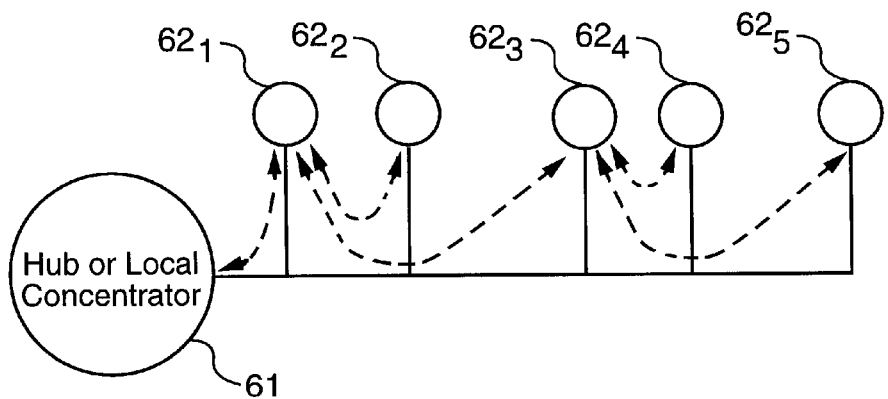
FIG. 6 is a high level block diagram showing meters connected to a hub or local concentrator via power lines, illustrating operation in a "leap frog" mode.

The second mode, "leap frog" or performing data relay through locally elected/designated meters to a central hub or distributed set of concentrators, is a more complex mode, illustrated in FIG. 6. Individual meters, $62_2$, $62_4$ and $62_5$, may be operated conventionally but other meters, $62_1$ and $62_3$, may be organized into store-and-forward groups. Meters $62_1$ and $62_3$, in the example illustrated, perform the store-and-forward function by collecting messages from other meters, reformatting the messages to reduce unnecessary overhead, and transmitting the collected messages as a single message to the next designated store-and-forward meter or to a hub or local concentrator 61. The advantage here is to those meters whose transmissions, for one reason or another, cannot get through to the hub. The transmissions are relayed by the designated store-and-forward meters that are perhaps closer to the hub or have a better propagation condition. Some of the meters grouped together may be on the same secondary circuit and not isolated from each other by distribution transformers. Also, the transmissions may not need to go all the way to hub 61 but may be collected and relayed by another medium, such as telephone or radio (not shown), at local concentrators.

Figure 7:
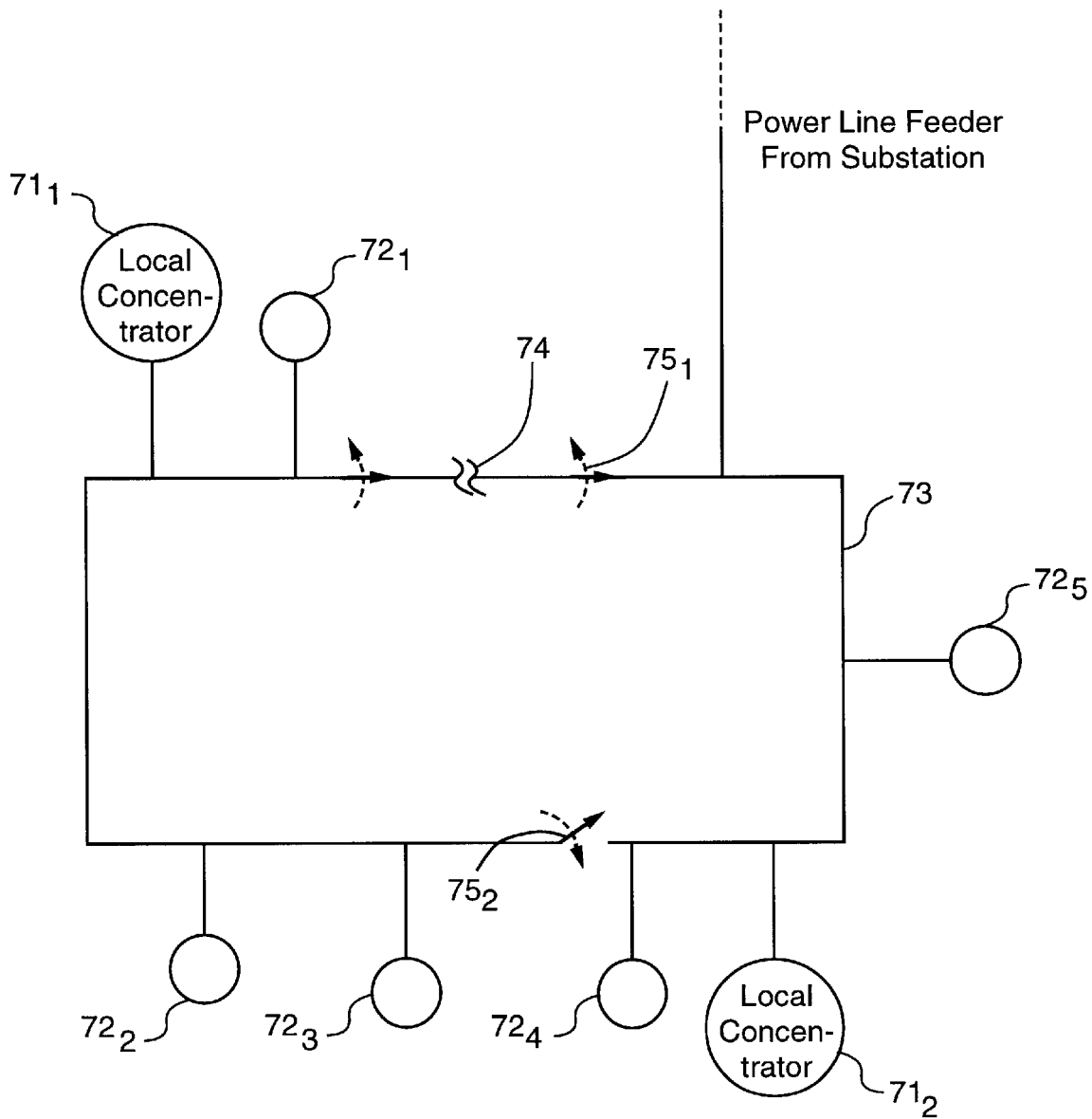
FIG. 7 is a high level block diagram showing meters connected to local concentrators via power lines, illustrating operation in a reconfigurable distribution mode.

The third mode is the "alarm channel" or reserving an HM signal set for meters to telemeter their configuration in a subnetwork after a power distribution network reconfiguration. This mode is illustrated in FIG. 7. It is not unusual for a distribution network 73 to be reconfigured either to better balance loads or to obviate faults 74 incurred due to weather or other disturbances. The opening and closing of switches $75_1$ and $75_2$ may cause meters $72_1$ to $72_5$ to drop from one hub or local concentrator $71_1$ group and join another hub or local concentrator $71_2$ group. The alarm channel mode can be used by a meter that has undergone such a reorganization to signal its membership or desire for membership in another local concentrator group.

Figure 8:
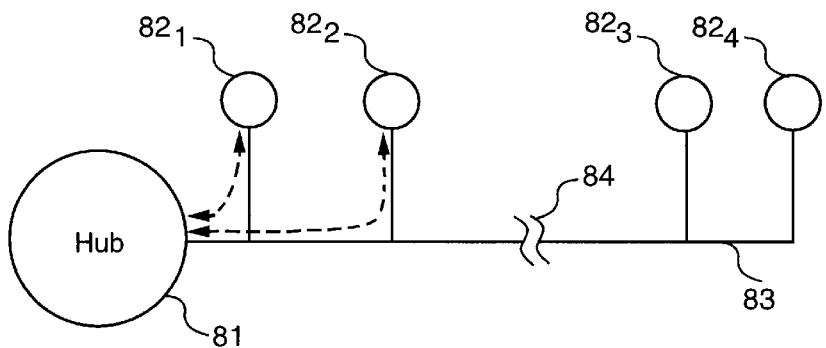
FIG. 8 is a high level block diagram showing meters connected to a hub via power lines, illustrating a fault diagnosis mode.

The fourth mode, "probing" or using HM polling to diagnose the location of a feeder fault, illustrated in FIG. 8, is a mode for helping to determine location of a fault 84 in a distribution power line 83. The probing mode involves sequential probing by hub 81 of meters $82_1$ to $82_4$ at ever increasing distances from the hub until no further response is received, thereby isolating the fault at some distance from the hub.

Figure 9:
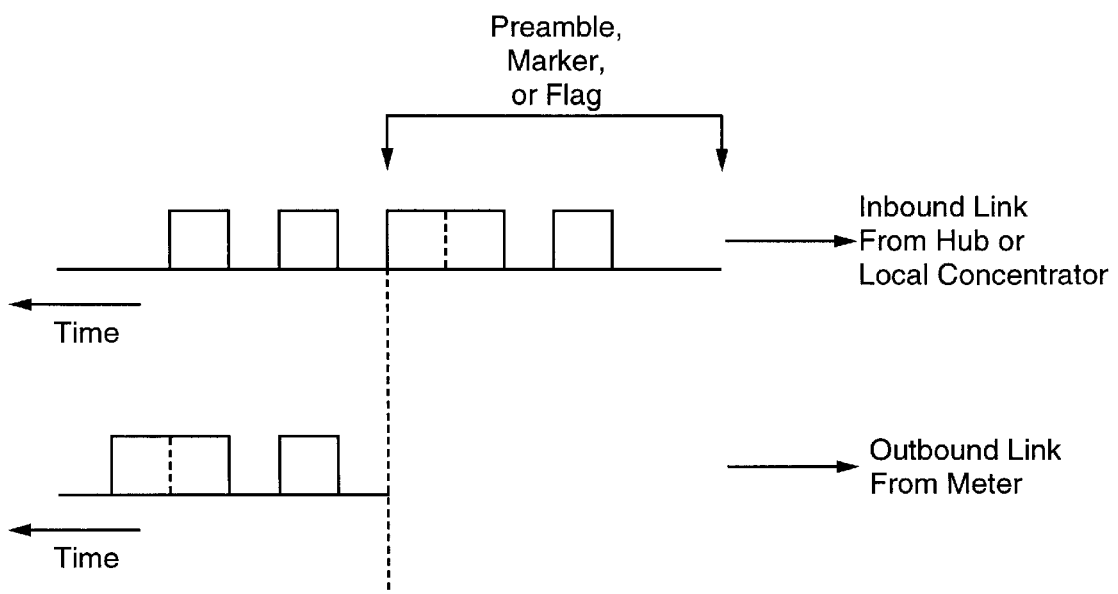
FIG. 9 is a timing diagram illustrating a technique for deriving the outbound start of message timing.

The fifth mode, "derived timing" or master derived timing for inbound messaging framing, denotes the technique in which an inbound signal from the hub or local concentrator is used to control meter transmission start times. Such technique results in better probability of synchronization and thereby successful reception of outbound messages from the meters. The inbound signal could be devised in many ways to accomplish this. FIG. 9 shows a preamble, marker, or flag, constituting a series of bits known to the meters, which is searched for in order to derive an allowable start of message timing. When this series of bits is detected, the local clock at the meter is reset.

The sixth mode, "rate adapting" or the idea of assigning the set of HM channels, or a subset thereof, to be either inbound or outbound, including dynamic allocation and reallocation of the usable HM channels to the outbound/inbound ratio, allows the HM network to be configured or reconfigured with an arbitrary ratio of outbound to inbound channels. This ratio may be selected and adjusted on the basis of traffic rate requirements and network and mode topology.

The seventh mode, "priority/noise based adapting" or allocating a mix of HM channels to the outbound/inbound ratio, allows any number of HM channels to be held in reserve, or switched into contingency service to handle high priority and perhaps high volume message outbound or inbound traffic. The particular HM channels can also be assigned to handle configuration of subnetworks should a noise condition require either a dynamic configuration of local concentrator groups or an increase in bandwidth to support a given traffic rate requirement, for example.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A protocol implemented in a spread spectrum power line communications (PLC) system for a power line exhibiting a carrier synchronous noise spectrum, said communications system comprising a plurality of meters, each of said meters including a respective transmitter for transmitting message bits on a power line, and at least one receiver in a central hub coupled to the power line for receiving messages transmitted by the transmitters, said protocol comprising the steps of:

synthesizing at a transmitter a waveform $s_i(t)$ having M tones described by $$s_i(t) = \sum_{k=1}^{M} \{\alpha_{ik}\sin(2\pi f_{ik}t + \phi_{ik}) + \beta_{ik}\cos(2\pi f_{ik}t + \theta_{ik})\}$$

where i is one of a plurality of different signals which may be transmitted simultaneously, $f_{ik}$ represents a selected frequency, t represents time, and $a_{ik}$ and $b_{ik}$ represent fixed amplitude coefficients for the i-th waveform;

modulating at the transmitter the M tones with data;

interstitially inserting the M tones in the power line synchronous noise spectrum so as to be effectively disjoint with the noise spectrum; and receiving the modulated M tones at the receiver, the transmission of data from the transmitters to the receiver being in a Master/Slave relation of meters to the receiver.

2. The PLC protocol of claim 1 wherein at least one of the meters includes an additional receiver and further comprising, at the receiver in the meter, the steps of:

receiving data from said transmitters in other meters;

collecting and storing received data;

reformatting the collected and stored data; and relaying the reformatted collected and stored data to said at least one receiver in said central hub.

3. The PLC protocol of claim 1 wherein the meters are connected in a power distribution network which is reconfigurable into a plurality of potentially overlapping subnetworks, each subnetwork having at least one subnetwork concentrator, further comprising the steps of:

reserving a harmonic modulated (HM) signal set for said meters to telemeter their configuration in a subnetwork after a power distribution network reconfiguration; and transmitting from a meter using the reserved HM signal set information indicating membership or desire for membership in a subnetwork by said meter after said power distribution network reconfiguration.

4. The PLC protocol of claim 1 wherein said central hub includes a transmitter and receiver, and further comprising the steps of:

polling meters with harmonic modulated signals from the central hub; and receiving messages from polled meters by the central hub to determine location of a feeder fault.

5. The PLC protocol of claim 1 wherein said central hub includes a transmitter and receiver and each of the meters includes a receiver, said protocol further comprising the steps of:

receiving at a meter receiver an inbound signal from the central hub;

detecting marker bits in said signal to derive timing information for inbound message framing at the receiver; and controlling start of outbound message timing from said meter in accordance with the derived timing information.

6. The PLC protocol of claim 1 wherein said central hub includes a transmitter and receiver and each of the meters includes a receiver, and further comprising the step of allocating a mix of harmonic modulation channels to act as outbound and inbound channels in an outbound/inbound ratio according to message traffic control requirements and power line distribution topology.

7. The PLC protocol of claim 6 further comprising the step of allocating a different mix of number of harmonic modulation channels to act as outbound and inbound channels, based on message priority or noise conditions.

* * * * *